United States Patent
Chong et al.

(10) Patent No.: US 11,454,137 B1
(45) Date of Patent: Sep. 27, 2022

(54) GAS TURBINE INNER SHROUD WITH ARRAY OF PROTUBERANCES

(71) Applicant: DOOSAN HEAVY INDUSTRIES & CONSTRUCTION CO., LTD., Changwon-si (KR)

(72) Inventors: Gene Chong, Jupiter, FL (US); Jae Bin Lee, Changwon (KR); Yunchang Jang, Changwon (KR); Haneul Kim, Changwon (KR); David Ohlschwager, Loxahatchee, FL (US)

(73) Assignee: DOOSAN HEAVY INDUSTRIES & CONSTRUCTION CO., LTD, Changwon-si (KR)

( * ) Notice: Subject to any disclaimer, the term of this patent is extended or adjusted under 35 U.S.C. 154(b) by 0 days.

(21) Appl. No.: 17/321,022

(22) Filed: May 14, 2021

(51) Int. Cl.
  *F01D 11/24* (2006.01)
  *F01D 25/24* (2006.01)
  *F01D 25/26* (2006.01)

(52) U.S. Cl.
  CPC .......... *F01D 25/246* (2013.01); *F01D 25/26* (2013.01); *F05D 2240/11* (2013.01); *F05D 2250/60* (2013.01); *F05D 2260/201* (2013.01); *F28F 2215/00* (2013.01)

(58) Field of Classification Search
  CPC .......... F01D 11/24; F01D 25/12; F01D 11/08; F05D 2240/11; F05D 2260/22141; F05D 2260/2214; F05D 2260/221; F05D 2260/2212; F28D 2021/0028; F28D 2021/0029; F28F 2215/00; F28F 2215/04; H01L 23/46; H01L 23/467; H01L 23/473; H01L 23/4735
  See application file for complete search history.

(56) References Cited

U.S. PATENT DOCUMENTS

| | | | |
|---|---|---|---|
| 6,379,528 B1 | 4/2002 | Lee et al. | |
| 6,402,464 B1 | 6/2002 | Chiu et al. | |
| 6,779,597 B2* | 8/2004 | DeMarche | F01D 11/24 165/169 |
| 7,033,138 B2* | 4/2006 | Tomita | F01D 11/005 415/139 |
| 8,814,507 B1* | 8/2014 | Campbell | F01D 25/12 415/173.1 |
| 8,876,458 B2* | 11/2014 | Thibodeau | F01D 25/246 415/1 |
| 9,103,225 B2* | 8/2015 | Lutjen | F01D 1/02 |
| 10,513,932 B2 | 12/2019 | Zelesky et al. | |
| 2006/0140753 A1* | 6/2006 | Romanov | F01D 25/12 415/173.1 |
| 2008/0089787 A1* | 4/2008 | Abdel-Messeh | F01D 5/187 416/179 |
| 2013/0243575 A1* | 9/2013 | Zelesky | F01D 5/187 415/116 |
| 2019/0309643 A1* | 10/2019 | Barker | F01D 11/122 |

\* cited by examiner

*Primary Examiner* — Christopher Verdier
*Assistant Examiner* — Maxime M Adjagbe
(74) *Attorney, Agent, or Firm* — Shook, Hardy & Bacon, LLP (57) ABSTRACT

An inner shroud block component for a gas turbine. The inner shroud block has a surface with a plurality of wells formed therein. An array of protuberances extend away from a base surface of each of the wells. The array of protuberances produces convective cooling of the inner shroud block, resulting in increased cooling of the inner shroud block and better part life. The increased cooling capacity also allows the turbine to operate at higher temperatures, which results in additional power generation.

19 Claims, 9 Drawing Sheets

GAS TURBINE INNER SHROUD WITH ARRAY OF PROTUBERANCES

TECHNICAL FIELD

The present invention generally relates to components for a gas turbine engine. More specifically, the present invention relates to a gas turbine inner shroud with a cooling array of protuberances.

BACKGROUND

Gas turbine engines, such as those used for power generation or propulsion, employ a series of turbine stages that extract usable energy from a flow of hot gas. The turbine stages typically include airfoils, such as stator vanes and rotor blades, and shroud components that contain the flow of hot gas. The turbine components are subjected to high-temperatures, and thus must be able to withstand thermal stresses. These thermal stresses can cause inefficiencies and part degradation. It is an on-going goal to reduce the thermal stresses to allow the turbine components to better withstand the operating environment. This is especially true of the inner shroud, due to its proximity to the hot gas path. One method for reducing the thermal stresses is to cool the components as much as possible. One method for cooling is to move a coolant, such as compressed air, through internal cooling cavities and onto surfaces of the compressor components. While existing cooling methods are somewhat effective, it would be desirable to add cooling capacity to the inner shroud components to further, or more effectively, reduce the thermal load. In addition, increased cooling capacity allows the turbine to operate at higher temperatures, which results in additional power generation by the hot gas flow.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes an inner shroud component for a gas turbine. The inner shroud has a surface with a plurality of wells formed therein. An array of protuberances extend away from a base surface of each of the wells. The array of protuberances increases the surface area of the base surface of the inner shroud, resulting in increased convective cooling of the inner shroud and better aeromechanical life objectives. The increased cooling capacity also allows the turbine to operate at higher temperatures, which results in additional power generation.

BRIEF DESCRIPTION OF THE DRAWINGS

The embodiments disclosed herein relate to compressor component airfoil designs and are described in detail with reference to the attached drawing figures, which illustrate non-limiting examples of the disclosed subject matter, wherein.

DETAILED DESCRIPTION

The subject matter of this disclosure is described herein to meet statutory requirements. However, this description is not intended to limit the scope of the invention. Rather, the claimed subject matter may be embodied in other ways, to include different steps, combinations of steps, features, and/or combinations of features, similar to those described in this disclosure, and in conjunction with other present or future technologies.

In brief, and at a high level, this disclosure describes an inner shroud component for a gas turbine. The inner shroud has a surface with a plurality of wells formed therein. An array of protuberances extend away from a base surface of each of the wells. The array of protuberances increases the surface area of the base surface of the inner shroud, resulting in increased convective cooling of the inner shroud. The increased cooling capacity results in longer part life and allows the turbine to operate at higher temperatures, which results in additional power generation.

Figure 1:
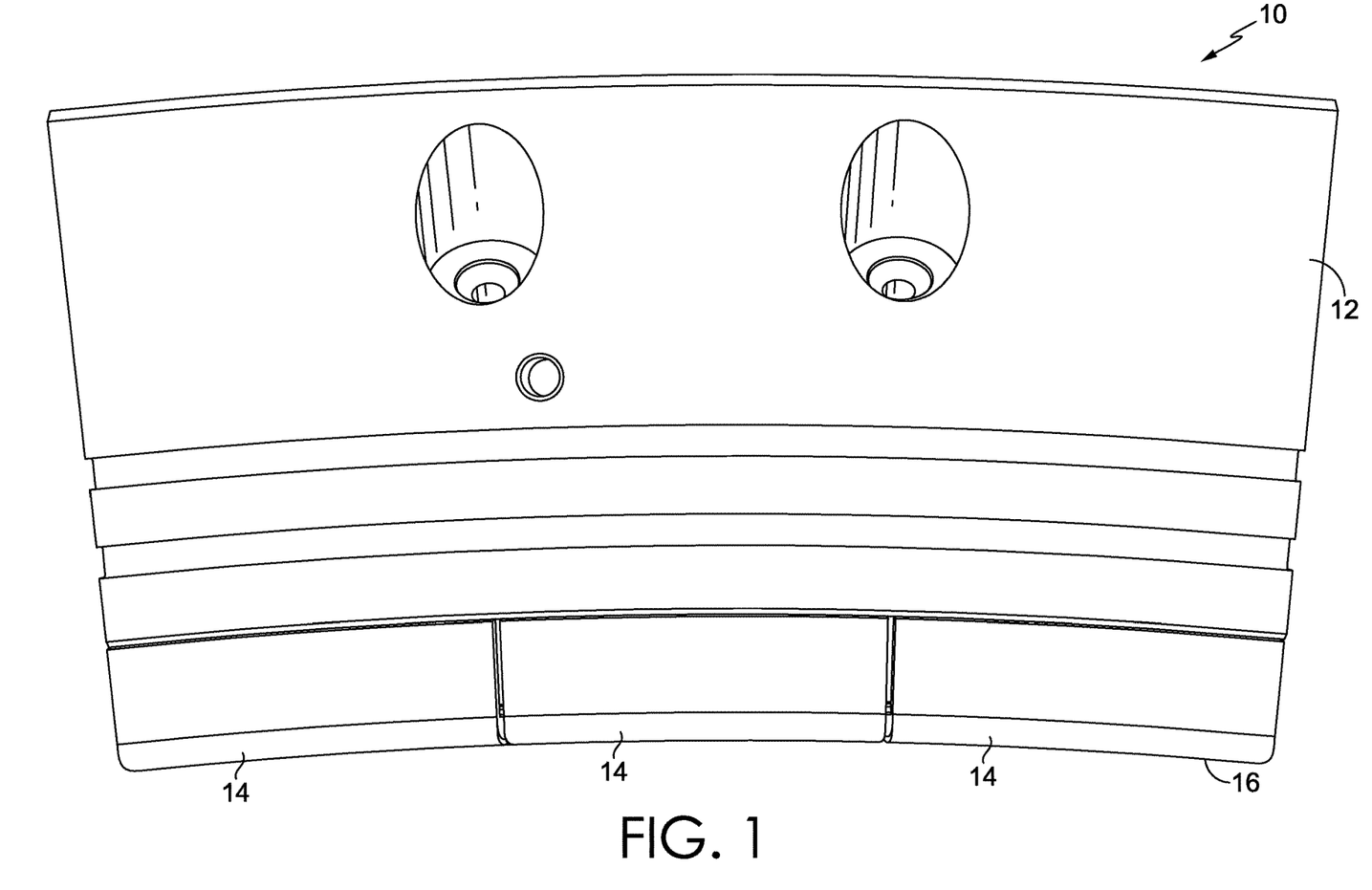
FIG. 1 depicts an axial view of an assembly of an outer shroud block and corresponding inner shroud blocks, in accordance with aspects hereof.
Figure 2:
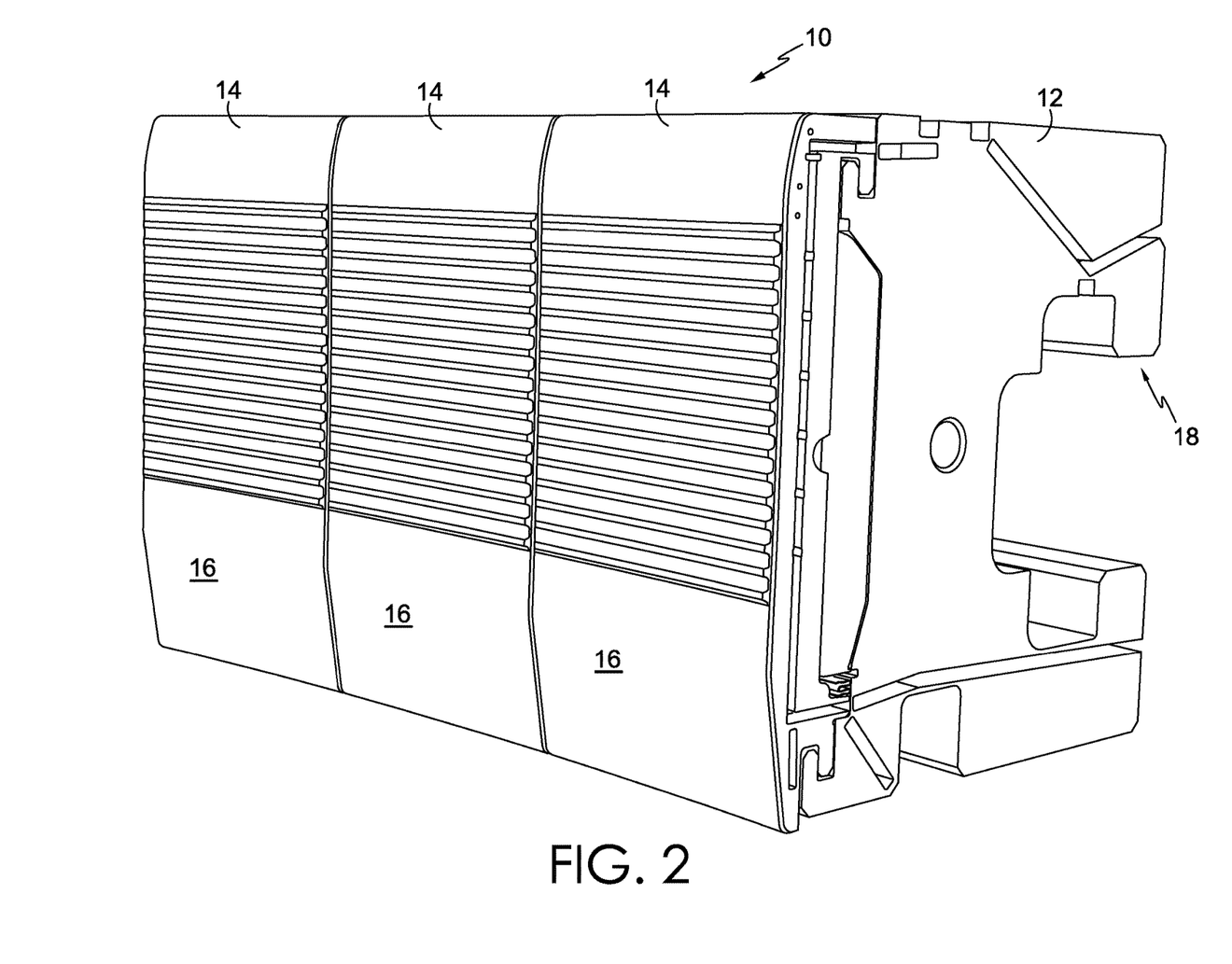
FIG. 2 depicts a perspective view of the assembly of FIG. 1, in accordance with aspects hereof.

Referring now to FIG. 1, there is illustrated an axial view of one aspect of an assembly 10 of an outer shroud block 12, and three inner shroud blocks 14 coupled to the outer shroud block 12. As will be understood by those of skill in the art, a number of the assemblies 10 are coupled together to form an annular ring, surrounding the hot gas path of a turbine. As viewed in FIG. 1, the hot gas path flows along an inward facing surface 16 of the inner shroud block 14. While three inner shroud blocks 14 are shown coupled to the outer shroud block 12, more, or fewer, inner shroud blocks 14 may be coupled to the outer shroud block 12. The outer shroud blocks 12 are coupled to a casing (not shown) of the gas turbine. As best seen in FIG. 2, the outer shroud block 12 may have a lip 18 to facilitate coupling to the casing of the gas turbine.

Figure 3:
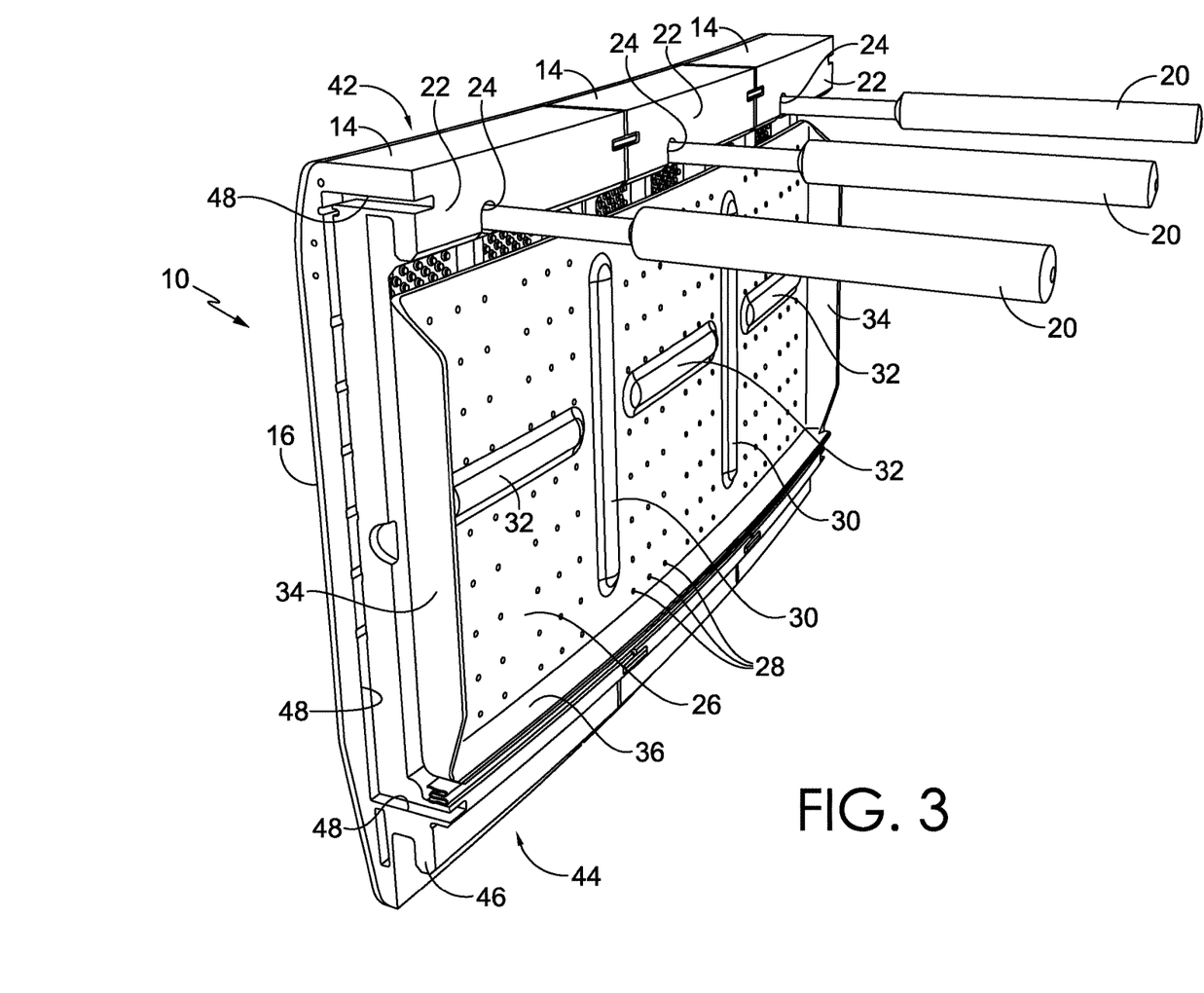
FIG. 3 depicts a perspective view of the assembly of FIG. 1, with the outer shroud block hidden, in accordance with aspects hereof.
Figure 4:
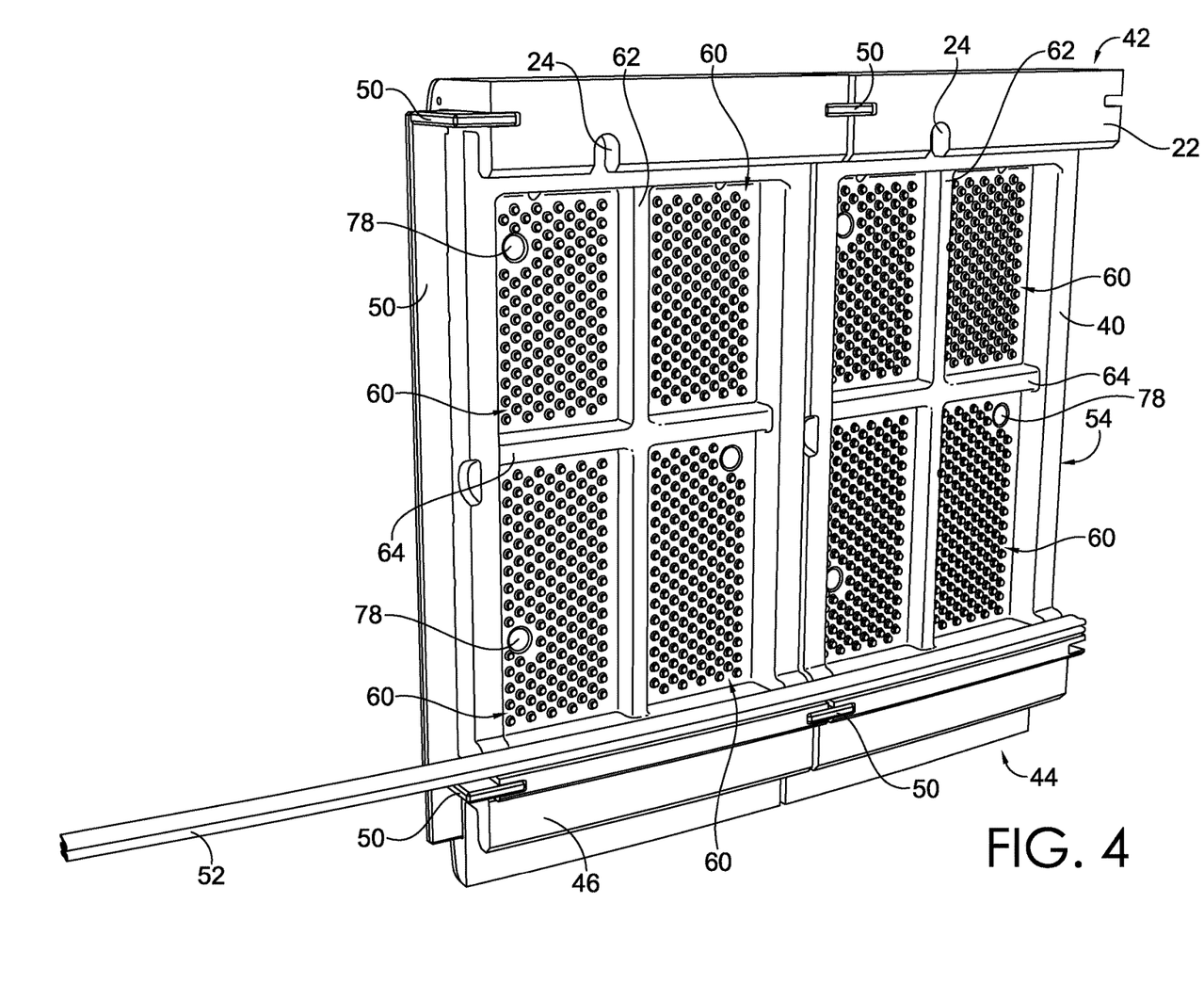
FIG. 4 depicts a perspective view of two inner shroud blocks coupled together, in accordance with aspects hereof.

FIG. 3 shows the assembly 10 without the outer shroud block 12 to show additional details of construction. As shown in FIG. 3, an anti-rotation pin 20 extends through the outer shroud block 12 to a forward hook 22 of each inner shroud block 14. As shown in FIG. 3, three anti-rotation pins 20 extend through the outer shroud block 12 and to a corresponding forward hook 22 of an inner shroud block 14. As seen in FIGS. 3 and 4, the forward hook 22, in some aspects, has an alignment notch 24 formed therein that receives an end of the anti-rotation pin 20. As also seen in FIG. 3, an impingement plate 26 is disposed between the outer shroud block 12 and the inner shroud block 14. In some aspects, the impingement plate 26 is coupled to the outer shroud block 12 (e.g., the impingement plate 26 may be welded to the outer shroud block 12). The impingement plate 26 includes a series of holes 28, through which cooling air is directed. Additionally, in some aspects, the impingement plate includes axial channels 30 and lateral channels 32 formed therein. The axial channels 30 are generally located adjacent a side coupling two inner shroud blocks 14. The impingement plate 26 may also have an extending lip 34 along the sides, where two adjacent outer shroud blocks 12 are coupled together, and a bottom, or aft, lip 36 extending along the aft edge of the impingement plate 26.

As seen in FIGS. 1 and 2, and as described above, each inner shroud block 14 has an inward facing surface 16 that is adjacent the hot gas path. As best seen in FIG. 4, each inner shroud block 14 has an outward facing surface 40, opposite the inward facing surface 16. Each inner shroud block 14 further has a forward end 42 opposite an aft end 44. The hot gas travels along the inward facing surface 16 from the forward end 42 to the aft end 44. In some aspects, the aft end 44 includes an aft hook 46. The forward hook 22 and the aft hook 46 are used in coupling the inner shroud block 14 to the outer shroud block 12. For example, the outer shroud block 12 may have reciprocal hooks configured to couple with the forward hook 22 and the aft hook 46. In some aspects, each side of the inner shroud block 14 has a groove 48 formed therein. The groove 48 may extend from the forward end 42, along the side, and to the aft end 44. As best seen in FIG. 4, the groove 48 supports a number of seals 50. In some aspects, the seals 50 extend from the groove 48 of one inner shroud block 14 to the groove 48 of an adjacent inner shroud block 14. The seals 50 aid in blocking the flow of hot gas along the edges of adjacent inner shroud blocks 14. In addition, the groove 48 may include one or more lateral notches formed therein (best seen in FIGS. 3 and 6). The lateral notches extend into the side of the inner shroud block slightly farther than does the groove 48. The lateral notches each permit a small amount of cooling air to pass from the plenum between the impingement plate 26 and the outward facing surface 40 to the hot gas side of the seals 50 to cool the structures present between adjacent inner shroud blocks 14 (e.g., sides, hot gas side of seals 50, etc.). As best seen in FIGS. 3 and 4, an aft seal 52 (e.g., a spring seal having a "W" shaped cross-section) may be used between the aft lip 36 of the impingement plate 26 and a surface forward of the aft hook 46 in the axial direction and between the inner shroud block 14 and the outer shroud block 12. The aft seal 52 may prevent or inhibit cooling air from escaping the plenum described above through any gaps that might be present between the aft hook 46 and the outer shroud block 12 (e.g., an aft hook of the outer shroud block).

Figure 5:
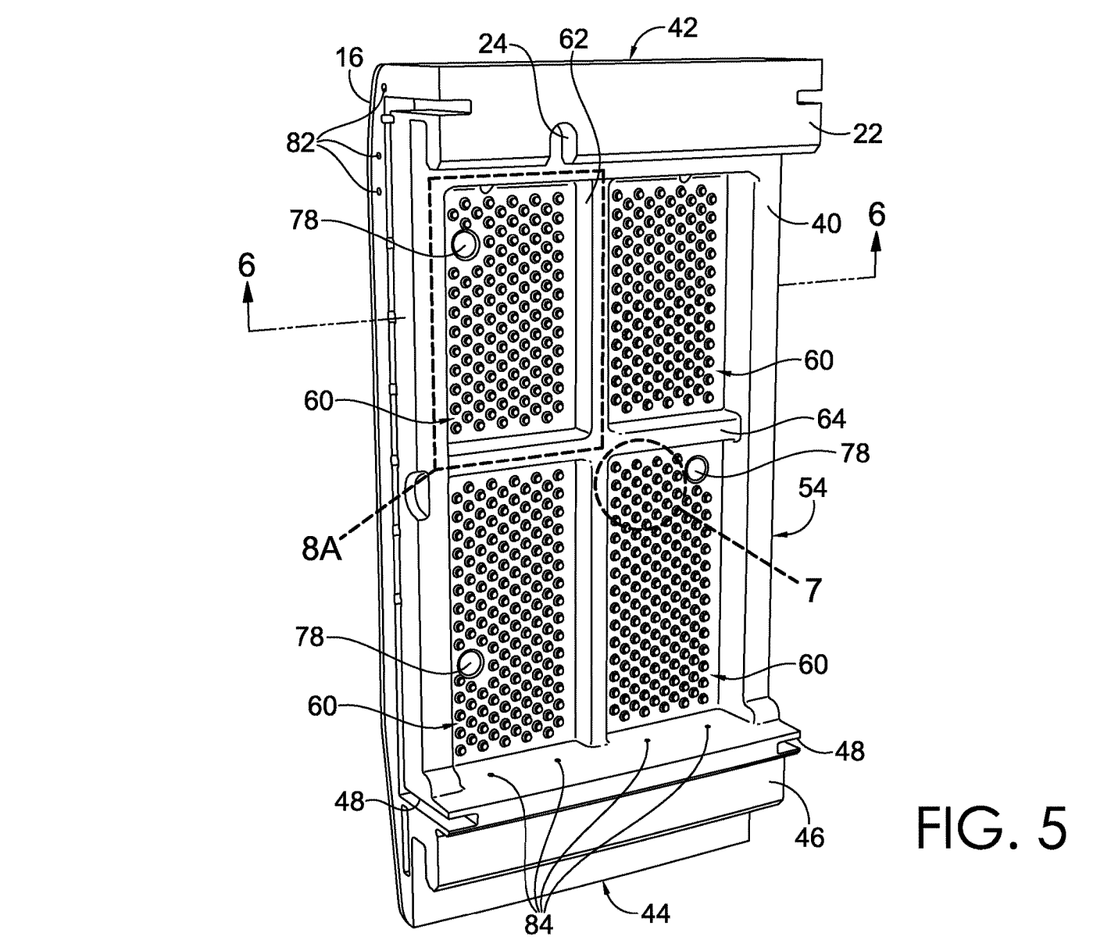
FIG. 5 depicts a perspective view of an inner shroud block, in accordance with aspects hereof.
Figure 6:
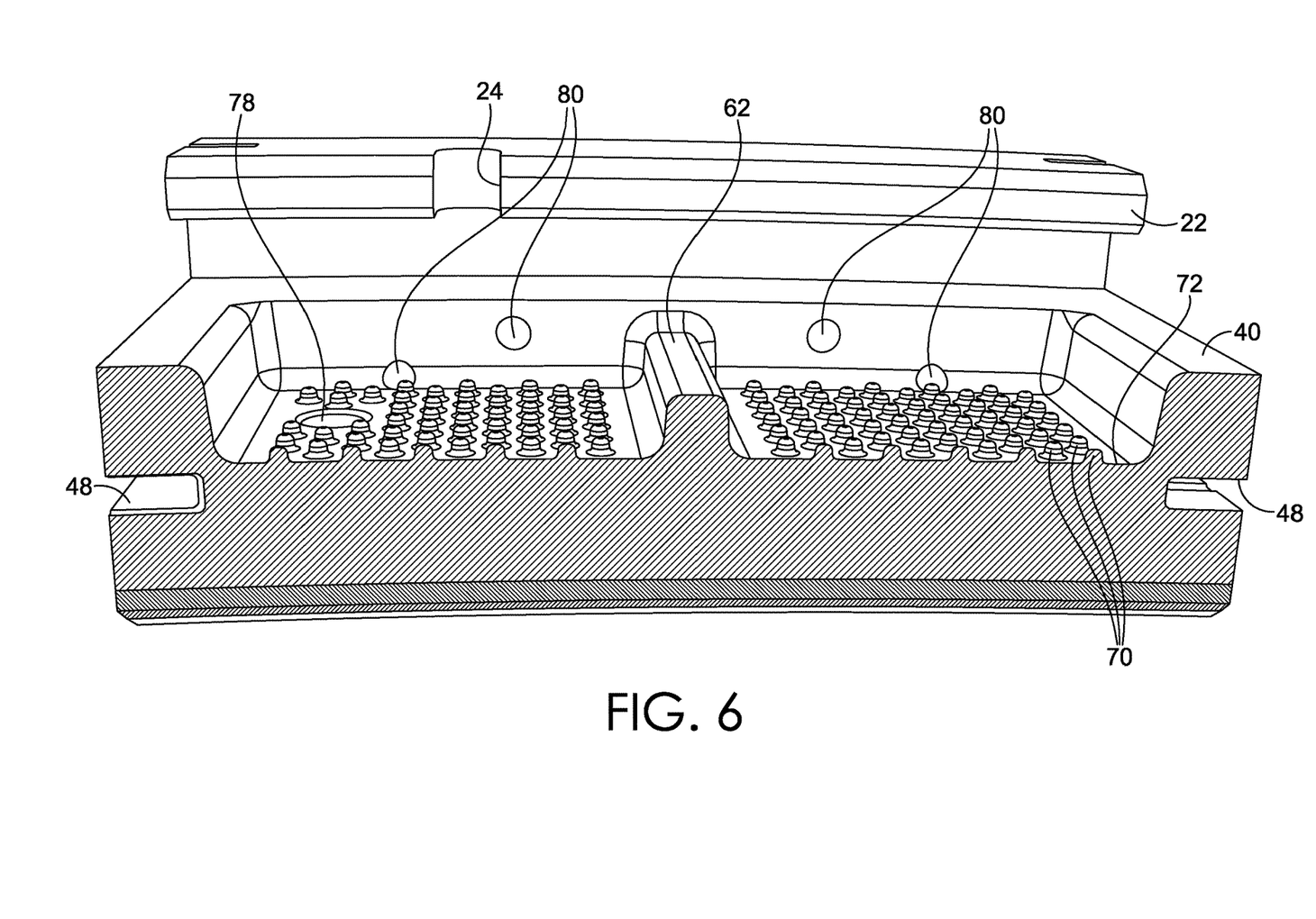
FIG. 6 depicts a cross-sectional view taken along line 6-6 of FIG. 5, in accordance with aspects hereof.

FIGS. 5-8B illustrate various aspects of an outward facing side 54 of the inner shroud block 14. The outward facing side 54 includes the outward facing surface 40 that is closer to the inward facing surface 16 than the inward-most part of the forward hook 22 and/or the inward-most part of the aft hook 46. Recessed from the outward facing surface 40 are a plurality of wells 60. In one aspect, as shown in the figures, the inner shroud block 14 has four wells 60, although more, or fewer wells, are also contemplated by this disclosure. The wells 60, in some aspects, are separated by an axial divider wall 62 and a lateral divider wall 64. The wall 62 and the wall 64 may be slightly recessed from the outward facing surface 40 and can add to the structural rigidity of the inner shroud block 14. In addition, the wall 62 and the wall 64 increase the surface area of the outward facing surface 40 and thus increase the convective cooling of the inner shroud block 14. In some aspects, the lateral wall 64 is located such that the wells 60 proximate the aft hook 46 have a greater area than the wells 60 proximate the forward hook 22. In other words, in some aspects, the lateral wall 64 is nearer the forward hook 22 than the aft hook 46. As best seen by comparing FIG. 3 and FIG. 4, in some aspects, the lateral divider walls 64 generally align with the lateral channels 32 on the impingement plate 26. In some aspects, at least some of the wells 60 may have a casting datum target pad 78, shown in the figures as a circular void. Additionally, as seen in FIG. 6, the inner shroud block 14 may include additional cooling air passages 80 that receive cooling air from the plenum and communicate it to cross-drilled cooling passages 82 (best seen in FIG. 5). The cross-drilled cooling passages 82 extend from a side of the inner shroud block 14 to one or more of the cooling air passages 80. The cross-drilled cooling passages 82 provide impingement cooling to a side of an adjacent inner shroud block 14 on the hot gas side of the seals 50. Similarly, as seen in FIG. 5, trailing cooling holes 84 receive cooling air from the plenum and communicate it to other portions of the inner shroud block 14. For example, the cooling holes 84 may communicate cooling air from the plenum to a gap between the aft hook 46 and an aft hook of the outer shroud block.

Figure 7:
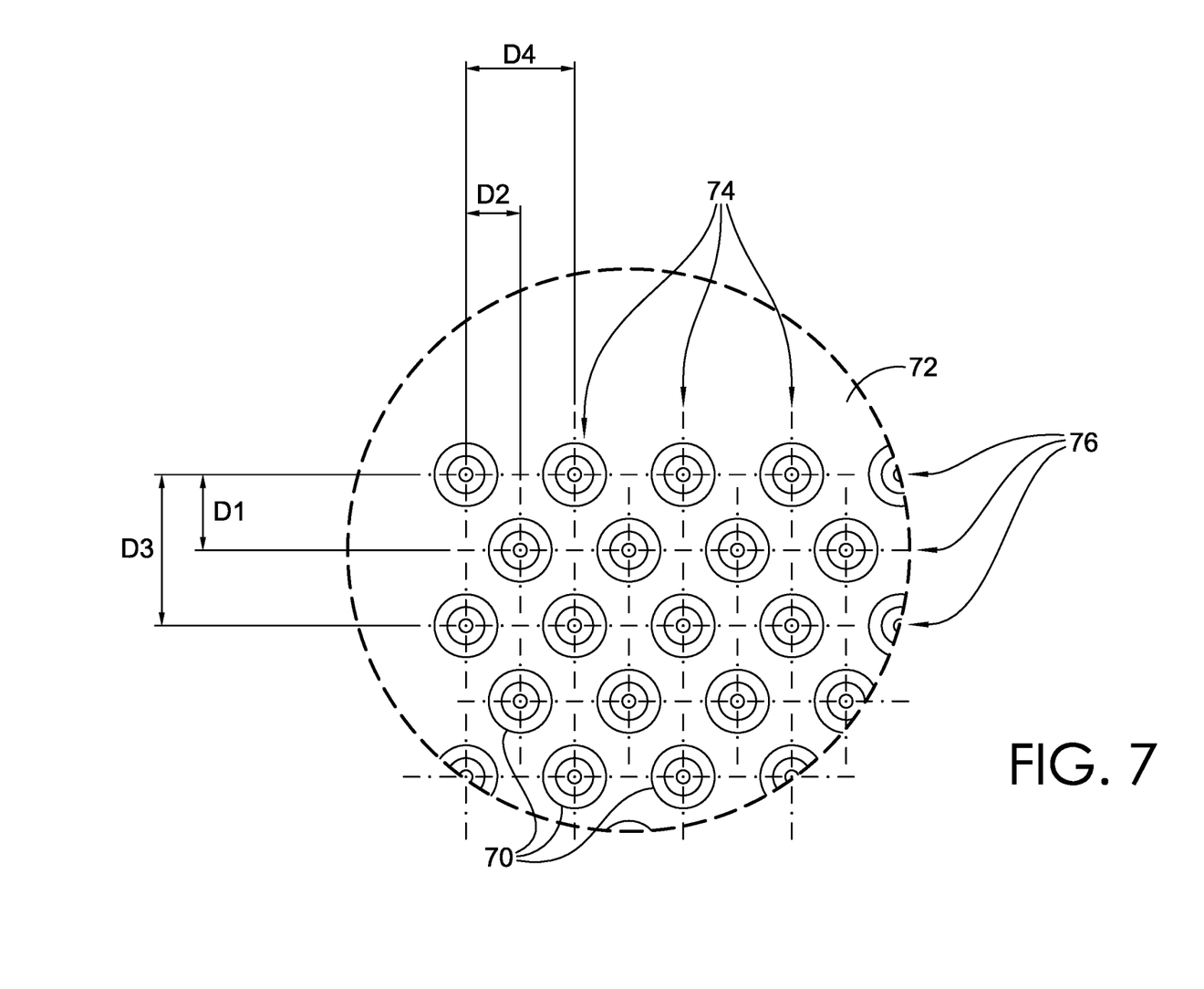
FIG. 7 depicts an enlarged view of the encircled portion 7 of FIG. 5, in accordance with aspects hereof.
Figure 8A:
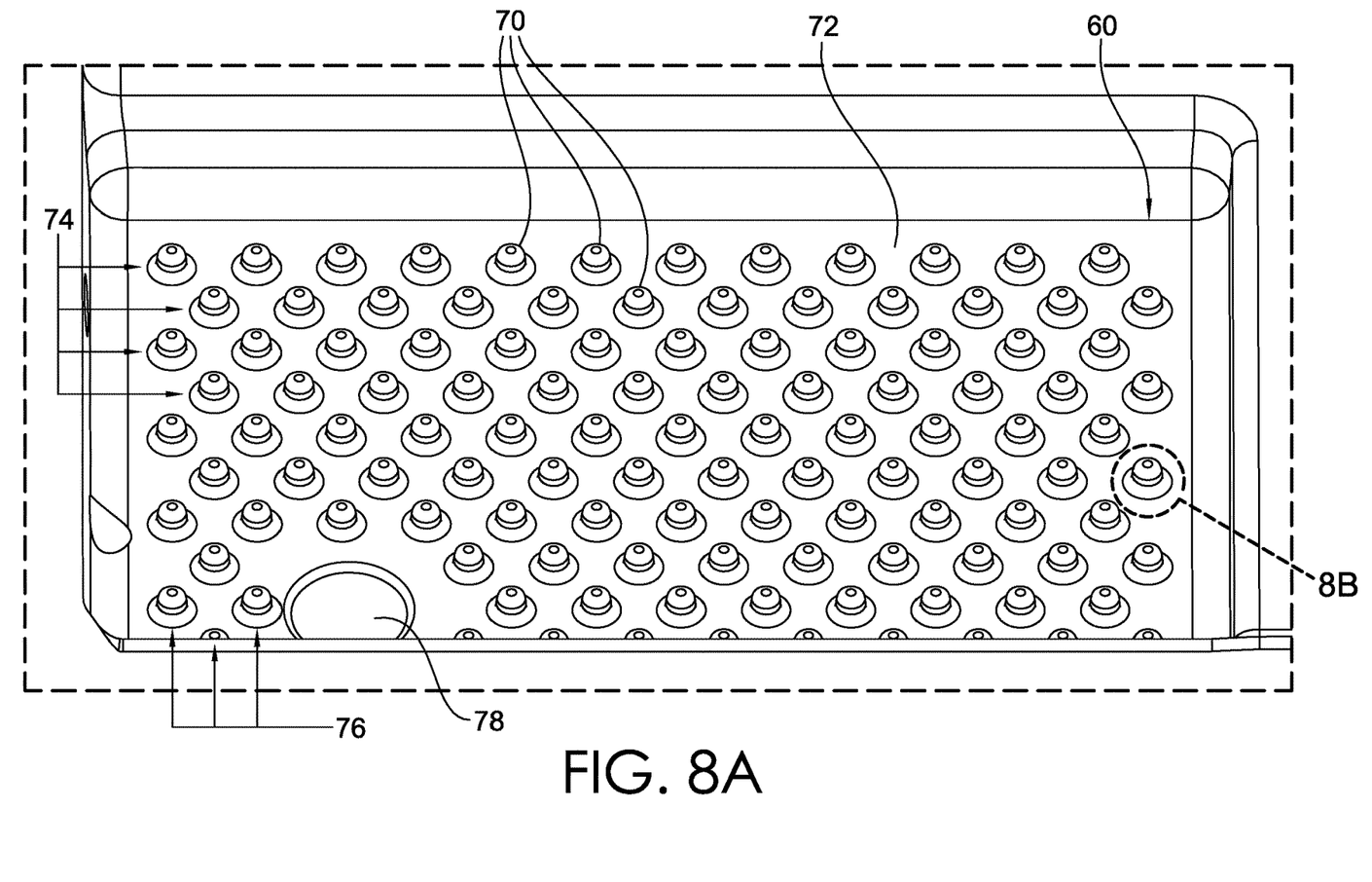
FIG. 8A depicts an enlarged view of the bounded region 8A of FIG. 5, in accordance with aspects hereof.
Figure 8B:
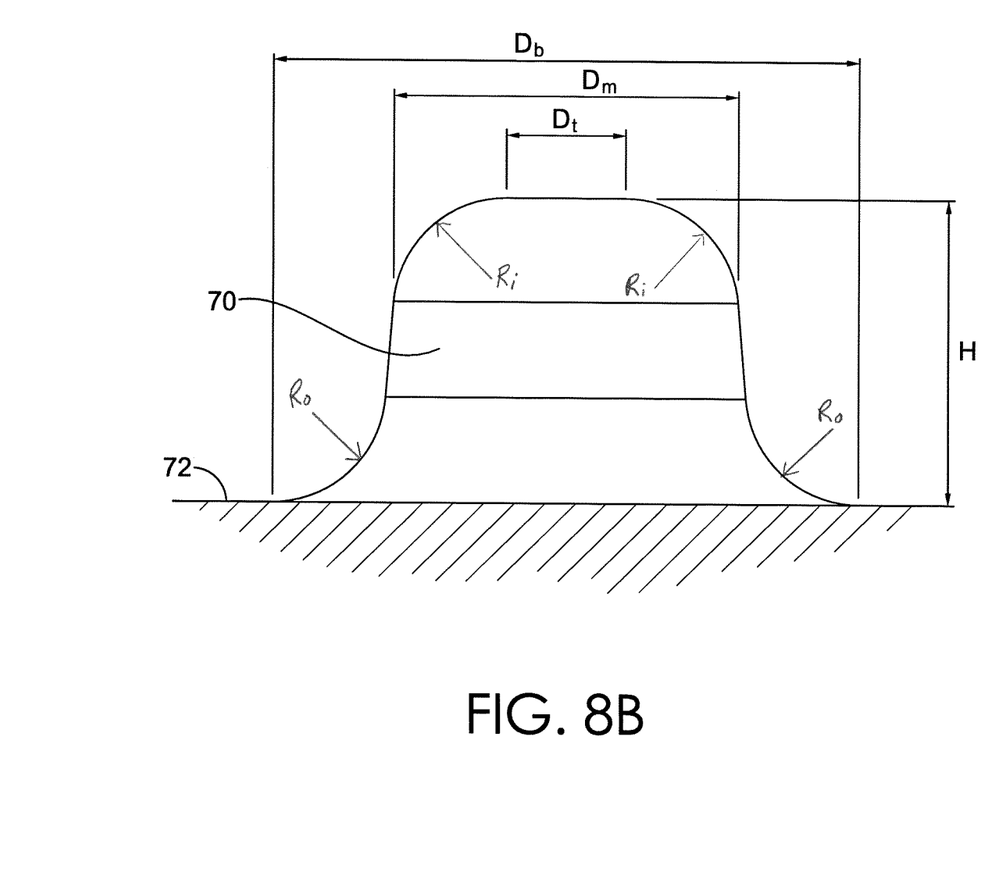
FIG. 8B depicts an enlarged view of the encircled region 8B of FIG. 8A.

As best seen in FIGS. 6-8B, each well 60 has a plurality of protuberances 70 that extend upwardly from a base surface 72 of the well 60. An individual protuberance 70 is shown isolated and enlarged in FIG. 8B. As shown in FIG. 8B, each protuberance 70 has a base diameter Db starting at the base surface 72 of the well 60. The base diameter Db transitions to a middle diameter Dm, which in turn transitions to a top diameter Dt. The middle diameter Dm, in some aspects, may be 0.047 inches. The middle diameter Dm may be formed with a +/−0.020 inch tolerance. As better seen in FIG. 8A, each protuberance 70 has a circular shape in cross-section, or as viewed from the top as seen in FIG. 7. Continuing with FIG. 8B, each protuberance has a height H that extends from the base surface 72 to the top of the protuberance 70. For example, the height H may be 0.040 inches, in accordance with aspects hereof. The height H may be formed with a +/−0.020 inch tolerance. In some aspects, as best seen in the cross-section of FIG. 6, the protuberances 70 extend in a direction away from inward facing surface 16, and away from the base surface 72. In some aspects, the height H of each protuberance is less than the height of the wall 62 and the wall 64. Additionally, in some aspects, each protuberance 70 has a mean average diameter (the mean average diameter of diameters Db, Dm and Dt), and the ratio of the height H over the mean-average-diameter is greater than 0.5. In further aspects, the ratio of the height H over the mean-average-diameter is in the range of 0.5 to 1.0.

In order to determine the proper ratio of height H over the mean-average-diameter, several design considerations must be addressed. First, the space between the base surface 72 of the wells 60 and the impingement plate 26 (i.e., the plenum) is very small and limits the height H of the protuberances 70. Second, manufacturing the inner shroud block 14 is preferably done through casting. In these aspects, the size and shape of the protuberances 70, which are generally very small relative to the size of the overall inner shroud block 14, is limited by the ability to reliably cast the protuberances 70. There are inside and outside radii Ri and Ro, respectively, associated with the size and shape of the protuberances 70 (as seen in FIGS. 8A and 8B) that are difficult to cast in if too small. In some aspects, Ri and Ro may each be 0.015 inches. The inside and outside radii Ri and Ro may be formed with a +/−0.008 inch tolerance. For example, if the height H is too short, these radii are difficult to reliably cast. In addition, if the protuberance 70 is too short or is too tall and thin, it will also be difficult to reliably cast. Third, there are diminishing returns on increasing the ratio of height H over the mean-average-diameter. For example, a ratio over 1.0 height H over the mean-average-diameter there is not a significant increase in cooling effectiveness as compared to such a ratio 0.5 to 1.0.

As best seen in FIG. 5 and FIG. 8A, the protuberances 70 are arranged as an array in each well 60. The array includes a plurality of axial aligned rows 74 of protuberances 70 that form a line in the forward-to-aft direction on inner shroud block 14 (top-to-bottom as viewed in FIG. 5). As best seen in FIG. 7, the protuberances 70 of one axial row 74 are staggered from the protuberances 70 of an adjacent axial row 74. In some aspects, the center line of a protuberance 70 in one axial row 74 is staggered, or offset, from the center line of a protuberance 70 in an adjacent axial row 74 by a distance D1. Additionally, the center line of each axial row 74 is spaced from the center line of an adjacent axial row 74 by a distance D2. As shown in FIG. 7, the center line of adjacent protuberances 70 in a same axial row 74 are spaced by a distance D3. Additionally, the array of protuberances 70 includes a plurality of lateral rows 76 that form a line in the side-to-side direction on the inner shroud block 14 (left-to-right as viewed in FIG. 5). As best seen in FIG. 7, the protuberances 70 of one lateral row 76 are staggered from the protuberances 70 of an adjacent lateral row 76. In some aspects, the center line of a protuberance 70 in one lateral row 76 is staggered, or offset, from the center line of a protuberance 70 in an adjacent lateral row 76 by the distance D2. Additionally, the center line of each lateral row 76 is spaced from the center line of an adjacent lateral row 76 by the distance D1. As shown in FIG. 7, the center line of adjacent protuberances 70 in a same lateral row 76 are spaced by a distance D4. While not intending to be bound by dimensional measurements, in some aspects: D1 is between about 0.080 inches and 0.100 inches, and in some aspects is 0.093 inches; D2 is between about 0.055 inches and 0.075 inches, and in some aspects is 0.067 inches; D3 is between about 0.160 inches and 0.200 inches, and in some aspects is 0.186 inches; and D4 is between about 0.110 inches and 0.150 inches, and in some aspects is 0.134 inches.

As cooling air moves through the holes 28 in impingement plate 26, the outward facing surface 40 of inner shroud block 14 and the features thereon (e.g., the protuberances 70, the base surface 72 of the wells 60, and the walls 62 and 64, etc.) experience impingement cooling from the cooling air forced through the holes 28. After the cooling air has reached the plenum, these same features of the outward facing surface 40 experience convective cooling as the air flows on and around the protuberances 70 and over the base surface 72 within the wells 60 and over the surfaces of the walls 62 and 64. The greater surface area provided by the protuberances 70 results in additional cooling area resulting in additional cooling of the inner shroud block. This is enhanced by the size of the protuberances 70 (with a ratio of height over mean-average-diameter greater than 0.5), and by the number, spacing and arrangement of the protuberances 70 within the array of the protuberances 70 in any of the wells 60. While the protuberances 70 are shown equally spaced in the figures, alternate or variable spacing of the protuberances could be used, in some aspects. Additionally, the cross-section of the protuberances 70 is shown as circular, but could be other shapes as well.

By providing the inner shroud block 14 with the cooling arrangement of the array protuberances 70 within the wells 60, added cooling is provided to the outward facing surface 40 of the inner shroud block 14, as compared to an inner shroud block with a planar outward facing surface, or a shroud block with only minimal surface protrusions.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the inner shroud block. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or embodiments of this application at the time of filing, or one or more related applications, but the claims or embodiments are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of embodiments" or similar variations of said terminology is intended to be interpreted such that features of claims/embodiments may be combined in any combination. For example, an exemplary embodiment 4 may indicate the method/apparatus of any of embodiments 1 through 3, which is intended to be interpreted such that features of embodiment 1 and embodiment 4 may be combined, elements of embodiment 2 and embodiment 4 may be combined, elements of embodiment 3 and 4 may be combined, elements of embodiments 1, 2, and 4 may be combined, elements of embodiments 2, 3, and 4 may be combined, elements of embodiments 1, 2, 3, and 4 may be combined, and/or other variations.

The following embodiments are aspects contemplated herein.

Embodiment 1. An inner shroud block having a forward end and an aft end, and having sides extending between the forward end and the aft end, comprising: an inward facing surface; an outward facing surface opposite the inward facing surface; a plurality of wells formed in the outward facing surface, the wells having a base surface below the outward facing surface; and an array of protuberances formed on the base surface of each of the plurality of wells, and extending away from the base surface.

Embodiment 2. The inner shroud block of embodiment 1, wherein the array of protuberances comprises a plurality of axial rows of protuberances, wherein each of the plurality of axial rows of protuberances extend in a forward-to-aft direction of the inner shroud block, wherein the protuberances of adjacent rows of the plurality of rows each axial row are staggered in the forward-to-aft direction from each adjacent axial row.

Embodiment 3. The inner shroud block of any of embodiments 1 or 2, wherein each axial row is staggered 0.093 inches in a side-to-side direction from each adjacent axial row.

Embodiment 4. The inner shroud block of any of embodiments 1-3, wherein the array of protuberances comprises a plurality of lateral rows of protuberances, wherein the plurality of lateral rows of protuberances extend in a side-to-side direction of the inner shroud block, wherein each lateral row is staggered in the side-to-side direction from each adjacent lateral row.

Embodiment 5. The inner shroud block of any of embodiments 1-4, wherein each lateral row is staggered 0.067 inches in a front-to-back direction from each adjacent lateral row.

Embodiment 6. The inner shroud block of any of embodiments 1-5, wherein each adjacent protuberance in a same axial row is spaced apart 0.134 inches.

Embodiment 7. The inner shroud block of any of embodiments 1-6, wherein each adjacent protuberance in a same lateral row is spaced apart 0.186 inches.

Embodiment 8. The inner shroud block of any of embodiments 1-7, wherein each protuberance has a height and a mean-average-diameter, wherein a ratio of height over mean-average-diameter is greater than 0.5.

Embodiment 9. The inner shroud block of any of embodiments 1-8, further comprising: a forward hook and an aft hook, wherein a forwardmost portion of the plurality of wells is rearward of a rearwardmost portion of the forward hook, and wherein a rearwardmost portion of the plurality of wells is forward of a forwardmost portion of the aft hook.

Embodiment 10. The inner shroud block of any of embodiments 1-9, further comprising: a left sidewall having a left side seal slot formed therein; and a right sidewall having a right side seal slot formed therein, wherein the left sidewall is opposite the right sidewall, wherein a leftmost portion of the plurality of wells is right of a rightmost portion of the left side seal slot, wherein a rightmost portion of the plurality of wells is left of a leftmost portion of the right side seal slot.

Embodiment 11. The inner shroud block of any of embodiments 1-10, wherein the plurality of wells comprises: a pair of forward wells; a pair of aft wells; a lateral wall separating the pair of forward wells from the pair of aft wells; and an axial wall separating the pair of forward wells from one another and separating the pair of aft wells from one another.

Embodiment 12. The inner shroud block of any of embodiments 1-11, wherein the plurality of wells, the lateral wall, the axial wall, and each of the arrays of protuberances are integrally formed.

Embodiment 13. The inner shroud block of any of embodiments 1-12, wherein the lateral wall and the axial wall each extend farther away from the base surface of each of the wells than does each protuberance of the array of protuberances.

Embodiment 14. The inner shroud block of any of embodiments 1-13, wherein a lateral row of one of the pair of forward wells is aligned in parallel with a lateral row of the other of the pair of forward wells.

Embodiment 15. The inner shroud block of any of embodiments 1-14, wherein an axial row of one of the pair of forward wells is aligned in parallel with an axial row of one of the pair of aft wells.

Embodiment 16. The inner shroud block of any of embodiments 1-15, wherein the pair of forward wells and the pair of aft wells have a same lateral width, wherein a first axial length of the pair of forward wells is smaller than a second axial length of the pair of aft wells.

Embodiment 17. The inner shroud block of any of embodiments 1-16, wherein each protuberance of the array of protuberances extend in a direction away from the inward surface.

Embodiment 18. The inner shroud block of any of embodiments 1-18, wherein a cross-section of each protuberance of the array of protuberances has a circular shape.

Embodiment 19. A shroud assembly comprising: an outer shroud; a plurality of inner shrouds, each inner shroud comprising: an inward facing surface; an outward facing surface; a plurality of wells formed in the outward facing surface, the wells having a base surface below the outward facing surface; and an array of protuberances formed on a bottom surface of each of the plurality of wells, and extending away from the base surface; and each inner shroud coupled to the outer shroud such that the inward facing surface faces away from the outer shroud and the outward facing surface faces the outer shroud.

Embodiment 20. The shroud assembly of embodiment 19, further comprising: the outer shroud having a coolant supply passage; and an impingement plate positioned between the coolant supply passage and the plurality of wells of each inner shroud.

Embodiment 21. Any of the aforementioned embodiments 1-20, in any combination.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. An inner shroud block having a forward end and an aft end, and having sides extending between the forward end and the aft end, comprising:
    an inward facing surface;
    an outward facing surface opposite the inward facing surface;
    a plurality of wells formed in the outward facing surface, the wells having a base surface below the outward facing surface; and
    an array of protuberances formed on the base surface of each of the plurality of wells, and extending away from the base surface,
    the protuberances having a bell shaped profile, the bell shaped profile comprising a base portion having a first diameter, a middle portion having a second diameter, and a top portion having a third diameter, wherein the first diameter is greater than the second diameter and the second diameter is greater than the third diameter,
    wherein each protuberance has a height and a mean-average-diameter, wherein a ratio of height over mean-average-diameter is greater than 0.5.

2. The inner shroud block of claim 1, wherein the array of protuberances comprises a plurality of axial rows of protuberances, wherein each of the plurality of axial rows of protuberances extend in a forward-to-aft direction of the inner shroud block, wherein each axial row is staggered in the forward-to-aft direction from each adjacent axial row.

3. The inner shroud block of claim 2, wherein each axial row is staggered 0.093 inches in a side-to-side direction from each adjacent axial row.

4. The inner shroud block of claim 1, wherein the array of protuberances comprises a plurality of lateral rows of protuberances, wherein the plurality of lateral rows of protuberances extend in a side-to-side direction of the inner shroud block, wherein each lateral row is staggered in the side-to-side direction from each adjacent lateral row.

5. The inner shroud block of claim 4, wherein each lateral row is staggered 0.067 inches in a front-to-back direction from each adjacent lateral row.

6. The inner shroud block of claim 1, wherein each adjacent protuberance in a same axial row is spaced apart 0.134 inches.

7. The inner shroud block of claim 1, wherein each adjacent protuberance in a same lateral row is spaced apart 0.186 inches.

8. The inner shroud block of claim 1 further comprising:
a forward hook and an aft hook,
wherein a forwardmost portion of the plurality of wells is rearward of a rearwardmost portion of the forward hook, and
wherein a rearwardmost portion of the plurality of wells is forward of a forwardmost portion of the aft hook.

9. The inner shroud block of claim 1 further comprising:
a left sidewall having a left side seal slot formed therein; and
a right sidewall having a right side seal slot formed therein, wherein the left sidewall is opposite the right sidewall,
wherein a leftmost portion of the plurality of wells is right of a rightmost portion of the left side seal slot,
wherein a rightmost portion of the plurality of wells is left of a leftmost portion of the right side seal slot.

10. The inner shroud block of claim 1, wherein the plurality of wells comprises:
a pair of forward wells;
a pair of aft wells;
a lateral wall separating the pair of forward wells from the pair of aft wells; and
an axial wall separating the pair of forward wells from one another and separating the pair of aft wells from one another.

11. The inner shroud block of claim 10, wherein the plurality of wells, the lateral wall, the axial wall, and each of the arrays of protuberances are integrally formed.

12. The inner shroud block of claim 10, wherein the lateral wall and the axial wall each extend farther away from the base surface of each of the wells than does each protuberance of the array of protuberances.

13. The inner shroud block of claim 10, wherein a lateral row of one of the pair of forward wells is aligned in parallel with a lateral row of the other of the pair of forward wells.

14. The inner shroud block of claim 10, wherein an axial row of one of the pair of forward wells is aligned in parallel with an axial row of one of the pair of aft wells.

15. The inner shroud block of claim 10, wherein the pair of forward wells and the pair of aft wells have a same lateral width, wherein a first axial length of the pair of forward wells is smaller than a second axial length of the pair of aft wells.

16. The inner shroud block of claim 1, wherein each protuberance of the array of protuberances extend in a direction away from the inward surface.

17. The inner shroud block of claim 1, wherein a cross-section of each protuberance of the array of protuberances has a circular shape.

18. A shroud assembly comprising:
an outer shroud having a forward lip and a rearward lip configured to couple with a casing of a gas turbine engine;
a plurality of inner shrouds, each inner shroud comprising:
an inward facing surface;
an outward facing surface;
a plurality of wells formed in the outward facing surface, the wells having a base surface below the outward facing surface; and
an array of protuberances formed on a bottom surface of each of the plurality of wells, and extending away from the base surface, wherein each protuberance has a height and a mean-average-diameter, wherein a ratio of height over mean-average-diameter is greater than 0.5; and
each inner shroud coupled to the outer shroud such that the inward facing surface faces away from the outer shroud and the outward facing surface faces the outer shroud.

19. The shroud assembly of claim 18 further comprising:
the outer shroud having a coolant supply passage; and
an impingement plate positioned between the coolant supply passage and the plurality of wells of each inner shroud.

* * * * *